(12) United States Patent
Yamaguchi (10) Patent No.: US 9,924,082 B2
(45) Date of Patent: Mar. 20, 2018

(54) IMAGING APPARATUS (71) Applicant: CANON KABUSHIKI KAISHA, Tokyo (JP)

(72) Inventor: Takashi Yamaguchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/072,118

(22) Filed: Mar. 16, 2016

(65) Prior Publication Data
US 2016/0277648 A1 Sep. 22, 2016

(30) Foreign Application Priority Data

Mar. 18, 2015 (JP) .................. 2015-055208

(51) Int. Cl.
H04N 5/222 (2006.01)
H04N 5/225 (2006.01)
H04N 5/33 (2006.01)
H04N 5/232 (2006.01)
G06K 9/00 (2006.01)
G06K 9/20 (2006.01)

(52) U.S. Cl.
CPC ....... H04N 5/2256 (2013.01); G06K 9/00604 (2013.01); G06K 9/2027 (2013.01); H04N 5/23219 (2013.01); H04N 5/33 (2013.01)

(58) Field of Classification Search
CPC ....... G06K 7/10732; G06K 2207/1012; G06K 9/2027; G06K 7/10544; G06K 7/10831; G01J 3/0264; G01J 3/0272; G01J 3/50; G01J 3/501; G02B 27/0075; G03B 15/02; H04N 5/2256; A42B 1/245; A61B 5/117

USPC .............. 348/143, 208.99, 216, 220.1, 222.1
See application file for complete search history.

(56) References Cited

U.S. PATENT DOCUMENTS

| | | | |
|---|---|---|---|
| 6,506,458 B1* | 1/2003 | Blatter | B05D 3/0263 427/385.5 |
| 9,313,376 B1* | 4/2016 | Bertolami | H04N 1/00161 |
| 2009/0303435 A1* | 12/2009 | Flitcroft | A61B 3/085 351/202 |

(Continued)

FOREIGN PATENT DOCUMENTS

JP 2004-179985 A 6/2004

Primary Examiner — Trung Diep
(74) Attorney, Agent, or Firm — Canon U.S.A., Inc. IP Division (57) ABSTRACT An imaging apparatus includes an illumination unit, an imaging unit, an illumination control unit, a target detection unit, a radiation illuminance, and a comparison unit. The illumination unit emits infrared light. The imaging unit captures an image of an object. The illumination control unit controls an illumination intensity of the illumination unit for irradiating the object. The target detection unit detects at least a portion of a human body contained within an irradiation range of the illumination unit. The radiation illuminance calculation unit calculates a radiation illuminance of the illumination unit with respect to the portion of the human body detected by the target detection unit. The comparison unit compares the radiation illuminance calculated by the radiation illuminance calculation unit with a predetermined threshold value. The illumination control unit controls the illumination intensity of the illumination unit based on a comparison result of the comparison unit.

17 Claims, 10 Drawing Sheets (56) References Cited

U.S. PATENT DOCUMENTS

2013/0076927 A1\* 3/2013 Lee ...................... H04N 5/2351
348/216.1

\* cited by examiner

IMAGING APPARATUS

BACKGROUND

Technical Field

The present disclosure relates to imaging apparatuses. For example, the present disclosure relates to an imaging apparatus provided with an illumination device.

Description of the Related Art

Conventionally, an imaging apparatus provided with an illumination device for monitoring at night or in the dark is known. Providing illumination while the imaging apparatus captures an image makes it possible to capture the image under a low light condition.

As a method of adjusting the illumination intensity of the illumination device in such an imaging apparatus, for example, Japanese Patent Application Laid-Open No. 2004-179985 discusses a control circuit configured to vary the illumination intensity in accordance with the illuminance on an object.

In recent years, to enable the imaging of an object that is farther away or an object under a low light condition, there has been an increasing demand for an imaging apparatus equipped with an illumination device with a higher illumination intensity limit.

SUMMARY

According to an aspect of the present disclosure, an imaging apparatus includes an illumination unit configured to emit infrared light, an imaging unit configured to capture an image of an object, an illumination control unit configured to control an illumination intensity of the illumination unit for irradiating the object, a target detection unit configured to detect at least a portion of a human body contained within an irradiation range of the illumination unit, a radiation illuminance calculation unit configured to calculate a radiation illuminance of the illumination unit with respect to the portion of the human body detected by the target detection unit, and a comparison unit configured to compare the radiation illuminance calculated by the radiation illuminance calculation unit with a predetermined threshold value, wherein the illumination control unit controls the illumination intensity of the illumination unit based on a comparison result of the comparison unit.

Further features of the present disclosure will become apparent from the following description of exemplary embodiments with reference to the attached drawings.

DESCRIPTION OF THE EMBODIMENTS

Hereinbelow, exemplary embodiments of the present disclosure will be described in detail with reference to the appended drawings. It is to be noted that configurations illustrated in the exemplary embodiments described hereinbelow are merely examples, and the present disclosure is not to be limited to the illustrated configurations.

Figure 1:
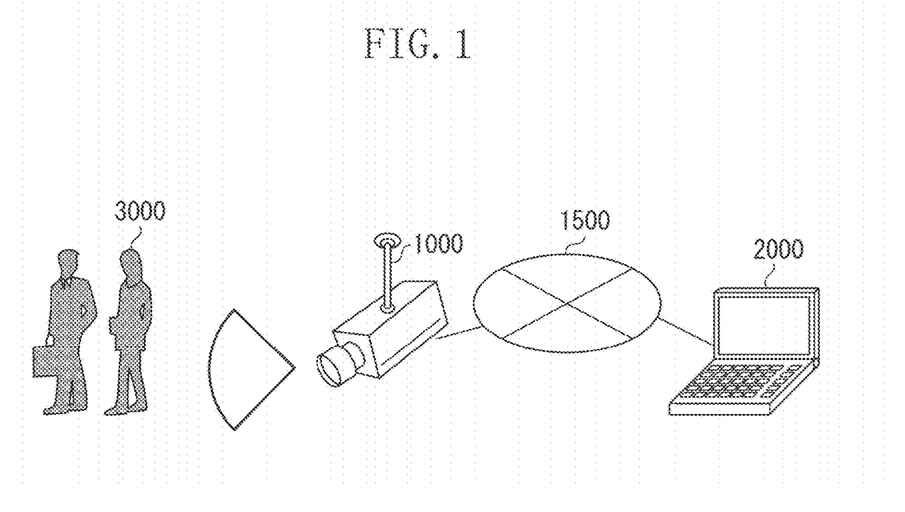
FIG. 1 illustrates an imaging system according to an exemplary embodiment of the present disclosure.

FIG. 1 is a system configuration diagram that includes an imaging apparatus 1000 and a client apparatus 2000 serving as an external apparatus. The imaging apparatus 1000 and the client apparatus 2000 are communicably interconnected via a network 1500. The client apparatus 2000 transmits various control commands to the imaging apparatus 1000. Such control commands include, for example, commands for starting or stopping imaging, and turning on an illumination device. Upon receiving a control command, the imaging apparatus 1000 transmits a response to the received control command, to the client apparatus 2000.

The imaging apparatus 1000 according to the present exemplary embodiment is an example of an imaging apparatus that captures an image of an object 3000 at a predetermined angle of view and is a monitoring camera for capturing a moving image, for example. To be more specific, the imaging apparatus 1000 is a network camera to be used for monitoring. The client apparatus 2000 according to the present exemplary embodiment is an example of an external apparatus, such as a personal computer (PC). A monitoring system constituted by the imaging apparatus 1000 and the client apparatus 2000 according to the present exemplary embodiment corresponds to an imaging system.

The network 1500 is constituted by a plurality of routers, switches, cables, and the like that satisfy the communication standards for Ethernet (registered trademark), for example. However, in the present exemplary embodiment, the network 1500 can be of any communication standard, of any size, or of any configuration as long as the network 1500 allows the imaging apparatus 1000 and the client apparatus 2000 to communicate with each other.

For example, the network 1500 may be constituted by the Internet, a wired local area network (LAN), a wireless LAN, a wide area network (WAN), or other networks. The imaging apparatus 1000 according to the present exemplary embodiment may be compatible, for example, with Power over Ethernet (PoN) (registered trademark) and may have electric power supplied thereto via a LAN cable.

Figure 2:
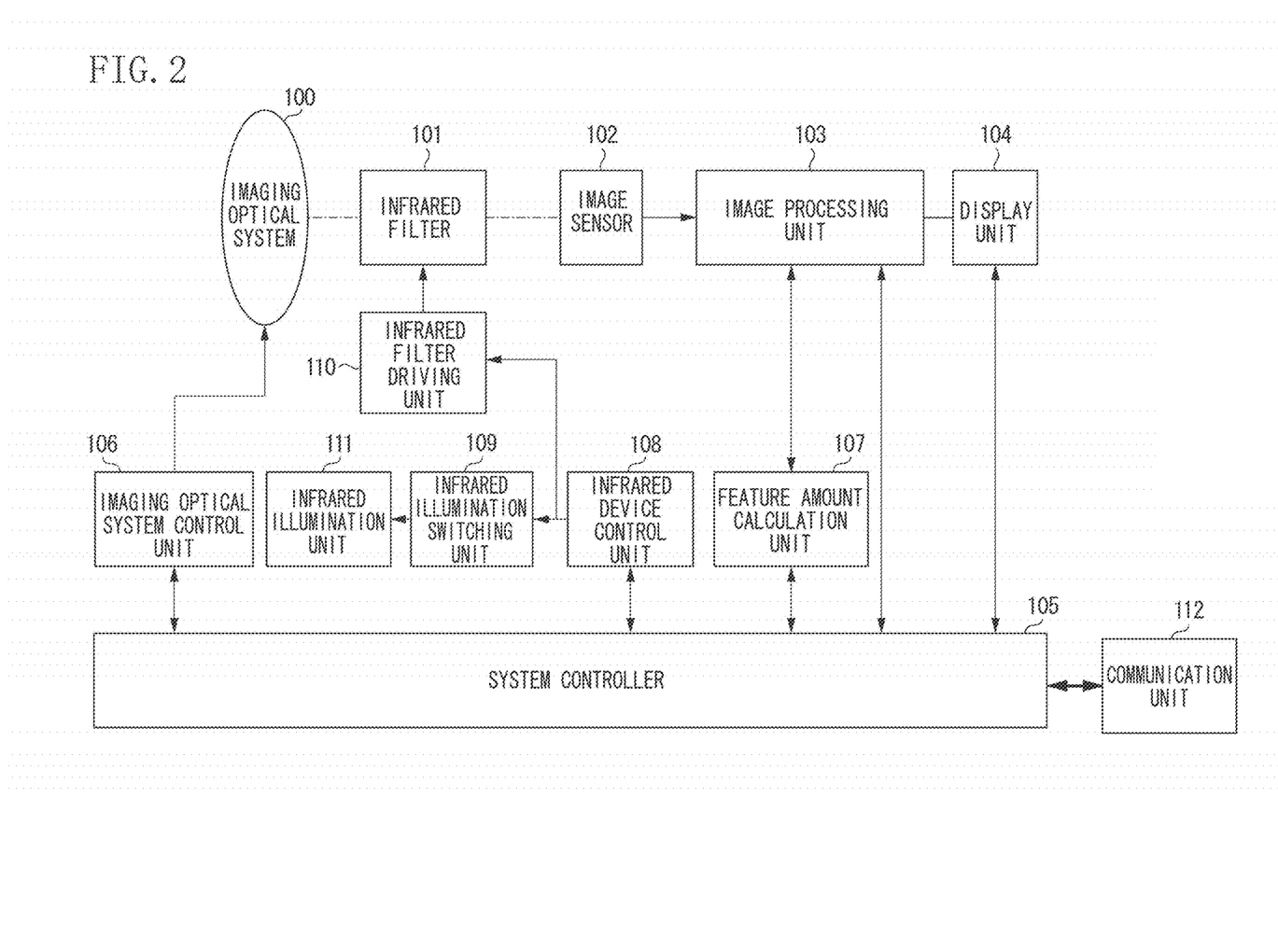
FIG. 2 is a block diagram illustrating an exemplary embodiment of the present disclosure.

FIG. 2 is a block diagram illustrating an internal configuration of the imaging apparatus 1000 according to the present exemplary embodiment. An image of the object 3000 is transmitted through an imaging optical system 100 and an infrared filter 101 and enters an image sensor 102, such as a charge-coupled device (CCD) sensor or complementary metal-oxide semiconductor (CMOS) sensor. Although the imaging optical system 100 is illustrated as a single lens in FIG. 2, the imaging optical system 100 may be constituted by a plurality of lenses. The infrared filter 101 may be constituted by a plurality of filters, such as an optical low pass filter and an optical band pass filter, and may be configured so that one or more of such filters can be selected as desired. Alternatively, instead of an infrared filter, a neutral density filter that reduces the quantity of light passing therethrough or a polarization filter that blocks light polarized in a predetermined direction may be used. The mechanical operation relating to a focus control, a zoom control, an exposure control, and an image-stabilization control of the imaging optical system 100 is carried out by an imaging optical system control unit 106 in accordance with an instruction from a system controller 105. Imaging conditions, such as an aperture value, a shutter speed, and a gain, for capturing an image at a predetermined exposure are determined by the system controller 105 based on a predetermined program diagram. In the present exemplary embodiment, the system controller 105 corresponds to a condition control unit configured to control the imaging conditions.

The image of the object formed on the image sensor 102 is converted into an image signal, and the converted image signal is input to an image processing unit 103. The image input into the image processing unit 103 is subjected to predetermined image processing, such as a gamma correction and a color balance adjustment, and an image file of the joint photographic expert group (JPEG) or the like is generated. The system controller 105 performs predetermined display processing on the output image processed by the image processing unit 103 to display the image on the display unit 104 in communication with the system controller 105.

The output image processed by the image processing unit 103 is also input to a feature amount calculation unit 107. The feature amount calculation unit 107 is controlled by the system controller 105. The feature amount calculation unit 107 analyzes an input image, acquires information, such as camera parameters, set via the system controller 105, and calculates the feature amount.

An infrared device control unit 108 controls an infrared device provided in the imaging apparatus 1000 in accordance with an instruction from the system controller 105. More specifically, the infrared device control unit 108 controls an infrared illumination unit 111 using an infrared illumination switching unit 109. The infrared device control unit 108 also controls the insertion and removal of the infrared filter 101 using an infrared filter driving unit 110.

The system controller 105 includes a central processing unit (CPU). The system controller 105 integrally controls the components of the imaging apparatus 1000 and also sets various parameters and the like. The system controller 105 further includes an electrically erasable memory (not illustrated) as a storage unit and executes a program stored in the memory. The memory is used as an area for storing a program to be executed by the system controller 105, a work area used during program execution, an area for storing data, or the like. In addition, the memory stores the initial values of various parameters serving as setting information to be used to control the imaging apparatus 1000. The system controller 105 also includes a timer unit (not illustrated) and can measure a predetermined duration at a desired timing.

A communication unit 112 is used to receive a control command from the client apparatus 2000 and to transmit a response to a control command or a video stream, to the client apparatus 2000.

An example basic configuration of the imaging apparatus according to the exemplary embodiment of the present disclosure has been described hereinabove. Although the infrared device control unit 108 is introduced herein to facilitate the understanding of the description, the system controller 105 may be connected directly to the infrared illumination switching unit 109 or the infrared filter driving unit 110.

Figure 3:
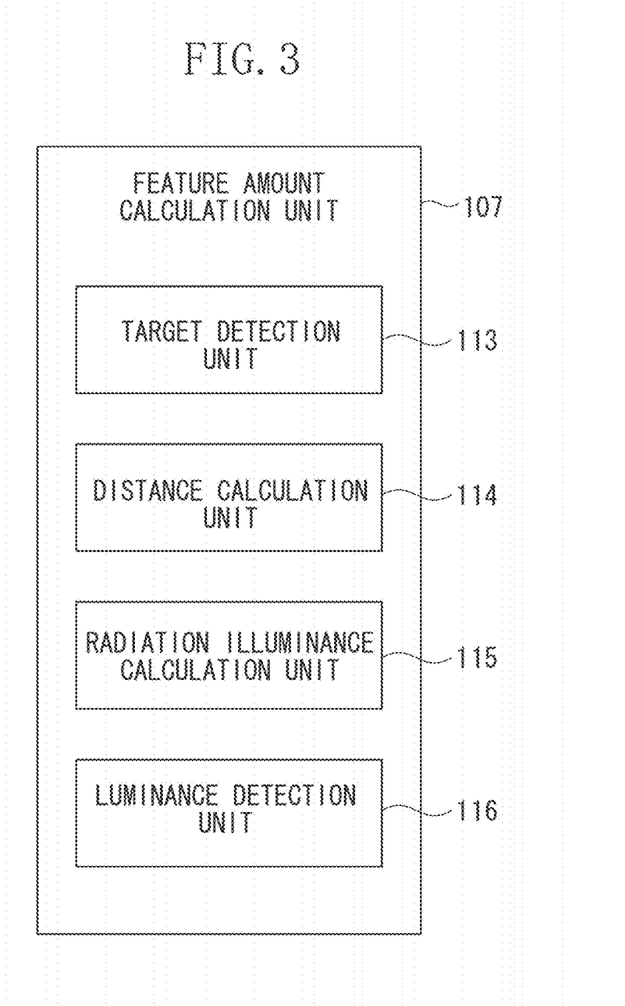
FIG. 3 is a block diagram illustrating a configuration of a feature amount calculation unit illustrated in FIG. 2.

FIG. 3 illustrates an example internal configuration of the feature amount calculation unit 107. In the present exemplary embodiment, the feature amount calculation unit 107 is constituted by a target detection unit 113, a distance calculation unit 114, a radiation illuminance calculation unit 115 and a luminance detection unit 116. The target detection unit 113 extracts the presence of a predetermined target from the entire image or a portion of the image input by the image processing unit 103. In the present exemplary embodiment, the target is assumed to be a human eye, but the present exemplary embodiment is not limited thereto. The distance calculation unit 114 calculates the distance between the target detected by the target detection unit 113 and the infrared illumination unit 111. The distance may be calculated based on the out-of-focus amount or the contrast amount of the image input by the image processing unit 103 or may be calculated based on driving parameters of the imaging optical system 100. Alternatively, a distance detection sensor that utilizes a phase difference may be provided separately. The radiation illuminance calculation unit 115 calculates the radiation illuminance at which the target is irradiated by the infrared illumination unit 111, and notifies the system controller 105 of the result. The system controller 105 drives the infrared device control unit 108 in accordance with that result. The luminance detection unit 116 calculates the luminance of an entire image or a portion of the image input by the image processing unit 103. The luminance detection unit 116 may also calculate a color difference signal in addition to the luminance or may calculate the luminance with a specific color condition being weighted. The configuration of the feature amount calculation unit 107 is not limited to the configuration described above. The feature amount calculation unit 107 may further include configurations for calculating, as a feature amount, for example, the contrast amount, the exposure amount of the object, the presence or the density of fog or haze, a parameter relating to the imaging apparatus and the image. The feature amount calculation unit 107 may be configured so that a part of the target image can be specified through the client apparatus 2000. Alternatively, a plurality of regions may be targeted, or a plurality of images input by the image processing unit 103 may be targeted. In the feature amount calculation unit 107, the target detection unit 113, the distance calculation unit 114, and the luminance detection unit 116 may target mutually different images.

Figure 4:
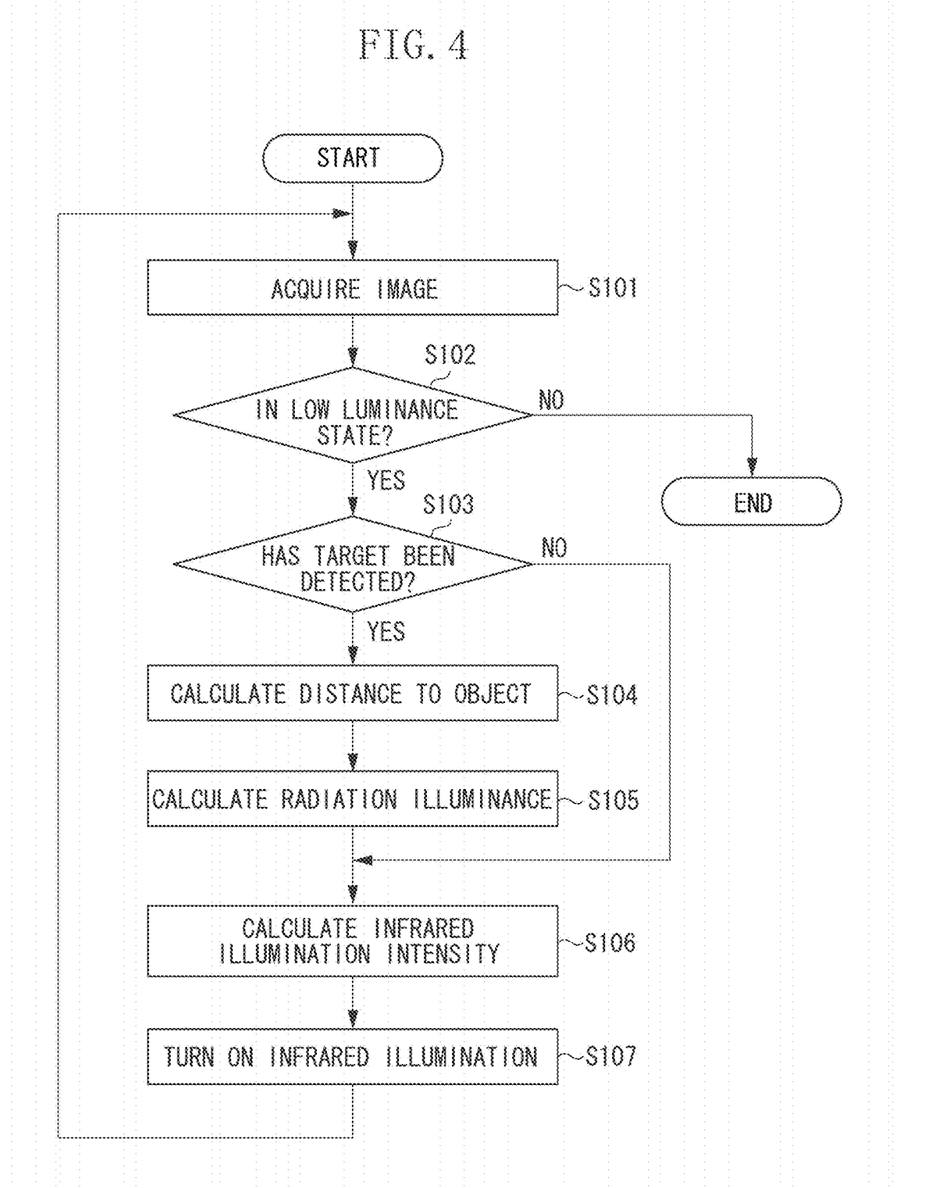
FIG. 4 is a flowchart illustrating operation processing according to a first exemplary embodiment of the present disclosure.

FIG. 4 is a first flowchart illustrating an example processing procedure relating to illumination control according to the present exemplary embodiment. The processing in this flowchart is carried out by the system controller 105.

First, in step S101, the system controller 105 acquires an image via the image processing unit 103. The processing then proceeds to step S102.

Subsequently, in step S102, the system controller 105 carries out control so that the acquired image is input to the feature amount calculation unit 107. Then, the luminance detection unit 116 calculates a mean luminance of the entire acquired image or a portion of the acquired image, or calculates a weighted mean luminance of a predetermined portion of the image. The system controller 105 then compares a threshold value stored in advance in the memory with the luminance value calculated by the luminance detection unit 116 and determines whether the result indicates a low luminance state. If the result of the determination does not indicate the low luminance state (NO in step S102), the processing in this flowchart is terminated. On the other hand, if it is determined that the result indicates the low luminance state (YES in step S102), the system controller 105 enters an infrared imaging mode. The infrared imaging mode herein is an imaging mode in which an image is captured with the infrared filter 101 removed from the optical path by controlling the infrared filter driving unit 110. When the infrared filter 101 is removed from the optical path, the color ratio changes. Therefore, the image processing unit 103 is controlled so as to carry out image processing by using image processing parameters for generating a black and white image. The processing then proceeds to step S103.

In step S103, the system controller 105 detects, using the target detection unit 113, a predetermined target in the image acquired by the image processing unit 103. In the present exemplary embodiment, the target is a human face. Targets to be detected by the target detection unit 113 may be stored in the memory within the system controller 105 and switched as appropriate, or may be set through the client apparatus 2000. When the target detection unit 113 has detected a face in the image, the target detection unit 113 calculates an area B of an eye in the face. This is because eyes are more affected by the influence of illumination on a human body. Although a human face and eyes are detected in the present exemplary embodiment, a region other than such parts may also serve as a target, or an object other than a human may serve as a target. When the result of the detection of the target detection unit 113 indicates that the target has been detected (YES in step S103), the processing proceeds to step S104. On the other hand, when no target has been detected (NO in step S103), the processing proceeds to step S106.

In step S104, the system controller 105 calculates the distance to the target detected in step S103 using the distance calculation unit 114. As the method of calculating the distance to the object herein, it is assumed that the distance is estimated based on a driving amount of the lens in the imaging optical system 100 and a variation amount of the object. However, a different method may be employed, and the distance may be measured with the use of, for example, a distance measurement sensor (not illustrated). The processing then proceeds to step S105.

In step S105, the system controller 105 calculates the radiation illuminance on the target using the radiation illuminance calculation unit 115. The radiation illuminance is calculated based on the distance to the target calculated by the distance calculation unit 114, the light distribution characteristics of the infrared illumination unit 111, the result of the detection of the target detection unit 113, and the like. The processing then proceeds to step S106.

In step S106, the system controller 105 calculates the illumination intensity and sets parameters relating to the intensity in the infrared device control unit 108. The parameter to be used to calculate the illumination intensity differs depending on whether the target has been detected in step S103. More specifically, if no target has been detected in step S103 (NO in step S103), the system controller 105 calculates the illumination intensity based on the luminance information calculated via the luminance detection unit 116 in step S102. On the other hand, if the target has been detected in step S103 (YES in step S103), the system controller 105 calculates the illumination intensity based on the luminance information calculated via the luminance detection unit 116 in step S102 and the radiation illuminance calculated in step S105. The processing then proceeds to step S107.

In step S107, the system controller 105 turns on the infrared illumination unit 111 using the infrared illumination switching unit 109. At this time, the infrared illumination unit 111 performs radiation at the illumination intensity calculated in step S106.

Figure 5:
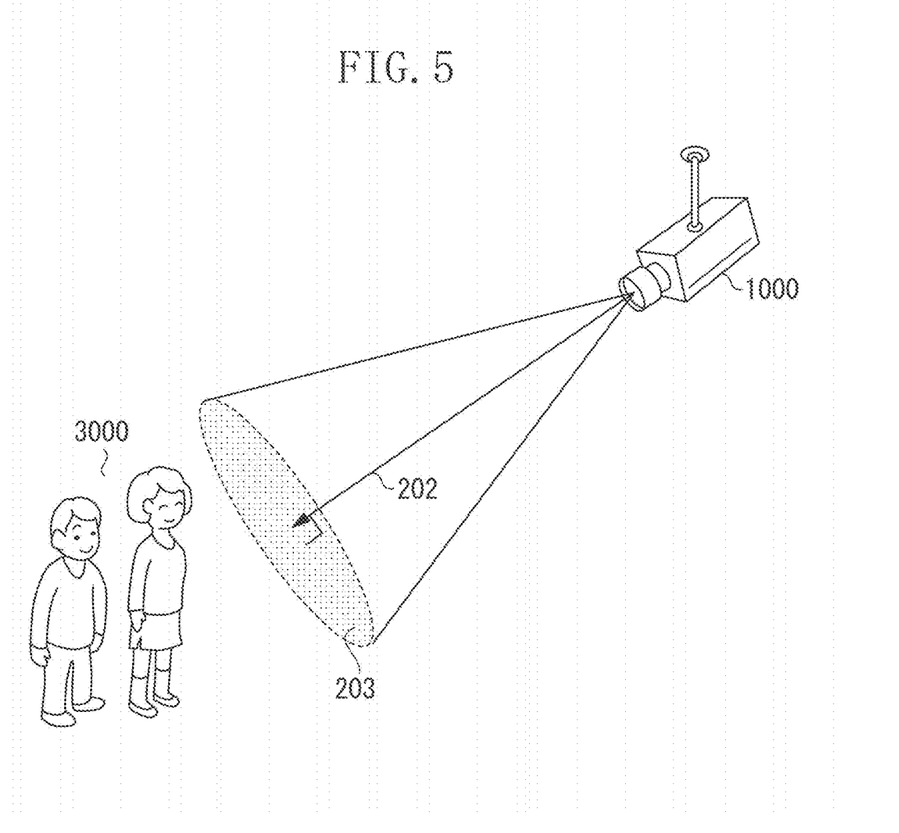
FIG. 5 is a diagram illustrating infrared illumination.

FIG. 5 illustrates the infrared illumination according to the present exemplary embodiment. The infrared illumination is determined based on the infrared illumination intensity calculated in step S106 and at which the imaging apparatus 1000 according to the exemplary embodiment of the present disclosure performs radiation, the distance 202 to the target calculated in step S104, and the irradiation area 203. As illustrated in FIG. 5, the imaging range (distance 202) in which the imaging apparatus 1000 captures an image coincides with the irradiation range (irradiation area 203) irradiated with the infrared illumination. This means that, when a human face has been captured (YES at step S103) in the image acquired in step S101, the human face has been irradiated with the infrared illumination.

Hereinbelow, the method of calculating the radiation illuminance in step S105 of FIG. 4 will be described in detail. The target detection unit 113 first detects a face region of a person. Then, the target detection unit 113 calculates the area A of the face in the image and the area B of an eye through the following expression (1).

$$B = \alpha \times A \quad (1)$$

Here, the coefficient $\alpha$ is a constant for calculating the proportion of the eye based on the area of the entire face and is a coefficient determined based on a predetermined model. The method of calculating the area B is not limited to the method described above, and the area B of the eye may be measured directly from the image. The area B may be calculated with the orientation of the face taken into consideration. More specifically, when a state in which the face is facing the imaging apparatus 1000 is set as 0 degree and an angle from that state is represented by $\theta$, the area B is calculated through the following expression (2).

$$B = \alpha \times A \times \sin \theta \quad (2)$$

Then, the radiation illuminance E is calculated through the following expression (3) with the use of the area B of the eye calculated through either of the above expressions, the illumination intensity $\Phi$ of the infrared illumination unit 111, and the distance X to the object.

$$E = \Phi / X^2 \times B \quad (3)$$

The illumination intensity $\Phi$ used in the expression (3) is calculated with the aperture value, the shutter speed, and the gain determined in accordance with the program diagram taken into consideration, so that the image to be captured is exposed appropriately.

Figure 6:
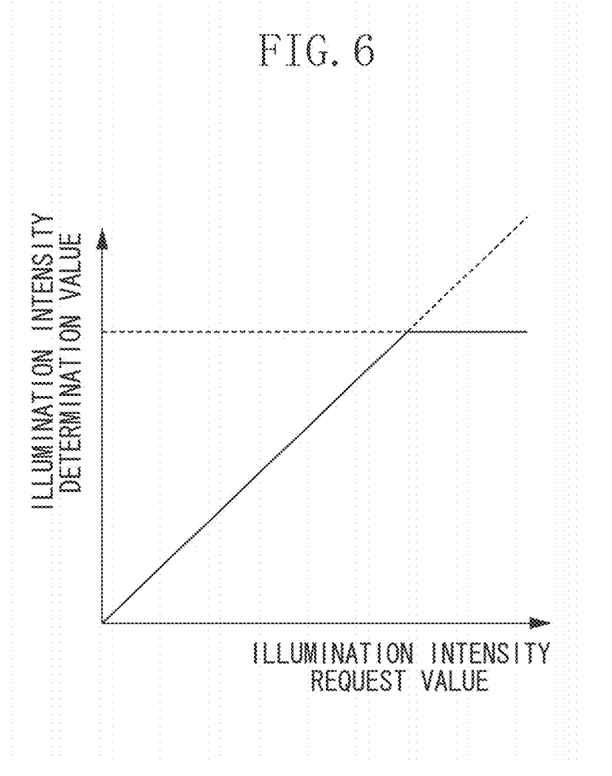
FIG. 6 is a graph illustrating a method of determining the intensity of an infrared illumination according to the first exemplary embodiment of the present disclosure.

Subsequently, the method of calculating the infrared illumination intensity in step S106 of FIG. 4 will be described in detail. The infrared illumination intensity is calculated with use of the radiation illuminance E calculated in step S105. When a human face (or an eye) serving as a target is not present in the image (NO) at S103), a necessary infrared illumination intensity is calculated from the step S102 determined luminance of the entire image or of a portion of the image. For example, the infrared illumination intensity is calculated with the aperture value, the shutter speed, and the gain determined in accordance with the program diagram taken into consideration, so that the image to be captured is exposed appropriately. On the other hand, when a human face (or an eye) serving as a target is present in the image (YES at S103), the radiation illuminance E calculated in step S105 is compared by the system controller 105 with a permitted radiation illuminance Emax. When the result of the comparison indicates that the radiation illuminance E is equal to or less than the permitted radiation illuminance Emax, the infrared illumination intensity is calculated in step S106 based on the illumination intensity Φ used for the calculation in step S105. On the other hand, when the step S105 calculated radiation illuminance E exceeds the permitted radiation illuminance Emax, the infrared illumination intensity is calculated in step S106 based on the illumination intensity Φ that satisfies the permitted radiation illuminance Emax. In other words, as indicated by the solid line in FIG. 6, the value of the illumination intensity Φ is limited so that the infrared illumination intensity calculated at step S106 does not exceed the maximum infrared illumination intensity. In the present exemplary embodiment, the maximum illumination intensity varies in accordance with the size of the face (or the eye) of the object and the distance to the object.

In this manner, according to the first exemplary embodiment, when a human eye is present in an image, the intensity of the infrared illumination is determined based on the irradiation intensity on the human eye. Thus, the imaging can be continued without irradiating a human body with infrared radiation having a high illumination intensity for a long period of time.

When the illumination intensity reaches the maximum illumination intensity, a case in which the luminance of the entire image fails to become appropriate can also be considered. In that case, it is preferable that the aperture value, the shutter speed, the gain, and the like be modified with the use of a program diagram different from the currently used program diagram.

When there is a plurality of people within an image, the illumination intensity may be determined based on the areas of the respective faces or based on a person closest to the imaging apparatus 1000.

The target detection unit 113 may be provided with a function of determining the gender or the age of a person within an image. In this case, the gender or the age may be used to calculate the maximum illumination intensity.

Although the illumination intensity is calculated based on the area B of an eye in the present exemplary embodiment, the present exemplary embodiment is not limited thereto. For example, the area of a face within an image or the area of a head may be used.

Figure 7:
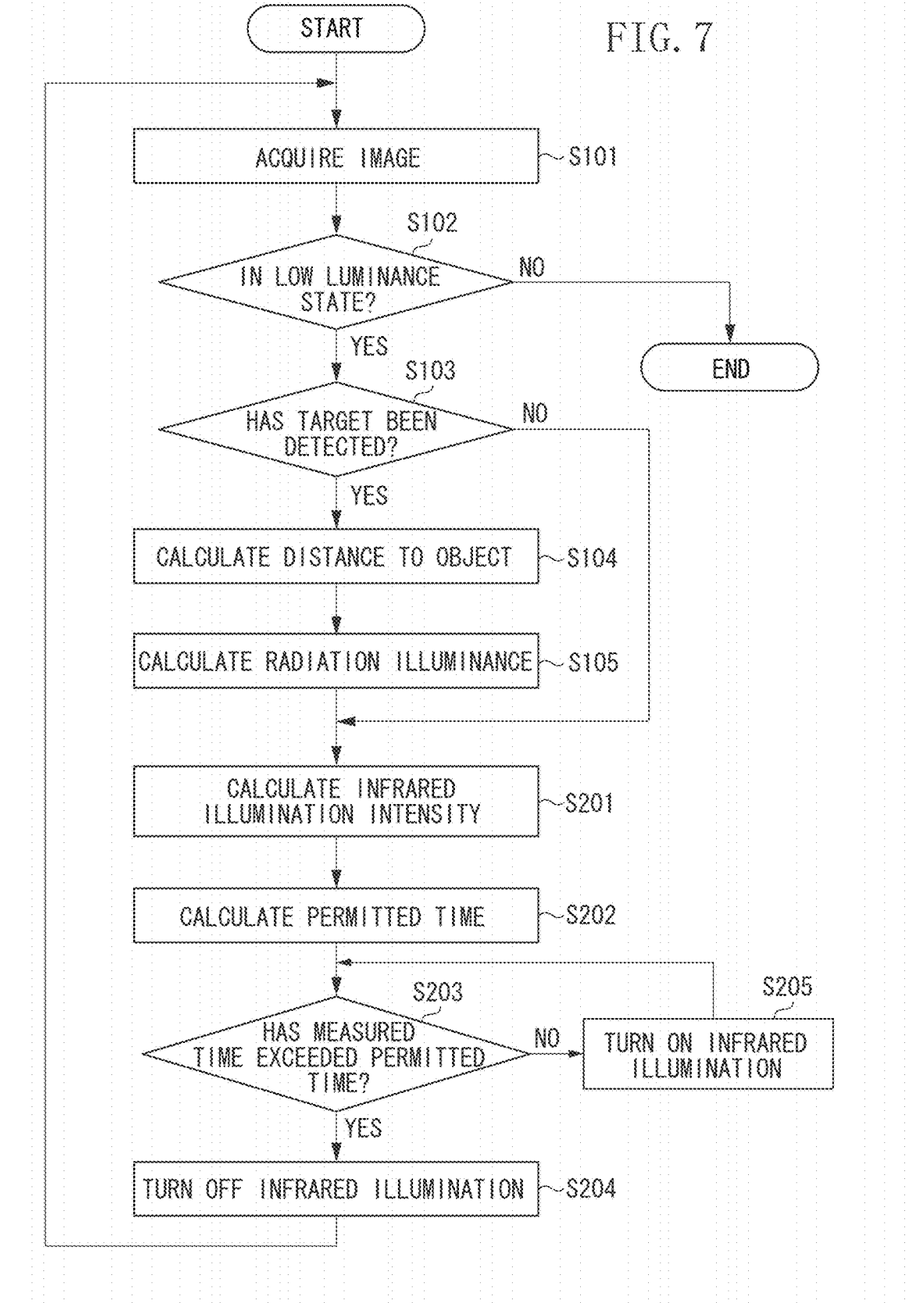
FIG. 7 is a flowchart illustrating operation processing according to a second exemplary embodiment of the present disclosure.

Referring to a flowchart illustrated in FIG. 7, a second exemplary embodiment of the present disclosure will be described. The configuration of an imaging apparatus according to the second exemplary embodiment is similar to the configuration described in the first exemplary embodiment with reference to FIG. 2, and thus description thereof will be omitted here. The second exemplary embodiment differs from the first exemplary embodiment in the processing after step S105 of FIG. 4. Therefore, the processing after step S105 will be described in detail, hereinbelow. The processing in the flowchart illustrated in FIG. 7 is carried out by the system controller 105.

Figure 8:
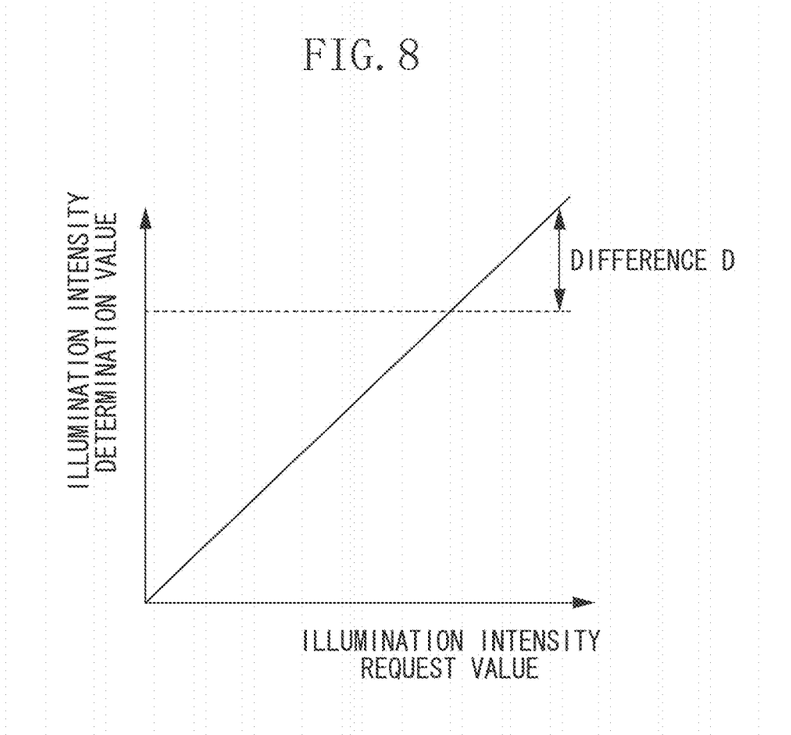
FIG. 8 is a graph illustrating a method of determining an intensity of an infrared illumination according to the second exemplary embodiment of the present disclosure.

In step S201, the system controller 105 determines the illumination intensity of the infrared illumination unit 111. More specifically, regardless of whether a human face (or an eye) serving as a target is present within an image, the illumination intensity of the infrared illumination unit 111 is determined so as to match a request value that is based on the luminance detection unit 116. In addition, when the request value exceeds the permitted illumination intensity, a difference D therebetween is obtained (FIG. 8). The processing then proceeds to step S202.

Figure 9:
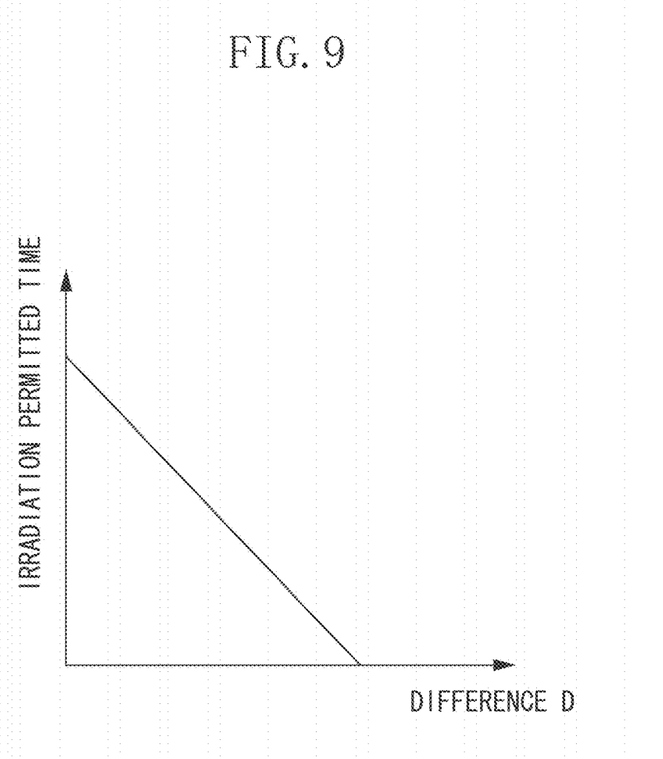
FIG. 9 is a graph illustrating an irradiation permitted time of the infrared illumination according to the second exemplary embodiment of the present disclosure.

In step S202, the system controller 105 calculates an irradiation permitted time based on the difference D. For example, as illustrated in FIG. 9, when the difference D is small, a cumulative quantity of light with which a human body is irradiated is small, and thus the permitted time is set longer. On the other hand, when the difference D is large, the irradiation is permitted only for a short duration. The processing then proceeds to step S203.

In step S203, the system controller 105 starts measuring an elapsed time when the irradiation starts. The system controller 105 then determines whether the result of the time-measurement (duration) has exceeded the irradiation permitted time. If the result of the determination indicates that the measured time does not exceeds the permitted time (NO in step S203), the processing proceeds to step S205, and the irradiation is continued. On the other hand, if the result of the determination indicates that the measured time has exceeded the permitted time (YES in step S203), the processing proceeds to step S204, and the irradiation is stopped.

In this manner, according to the second exemplary embodiment, the imaging can be continued at a brightness that is based on luminance information within a permitted time. Therefore, even when a person has unintentionally looked at the imaging apparatus, for example, the imaging can be continued at an appropriate brightness within the permitted time without the image becoming dark. When the person continues to look at the infrared illumination beyond the permitted time, the illumination is turned off. Therefore, a human body can be prevented from being irradiated with infrared radiation having a high illumination intensity for a long period of time, and an influence on the human body can be suppressed.

When the elapsed time is measured in step S203, the timer unit may be initialized to an initial value or may be paused upon a target going out of the screen. If the timer unit is paused, upon a target reappearing in the screen, it may be determined whether these targets are identical, and if it is determined that the targets are identical, the measurement may resume from the state in which the timer unit has been paused.

Thus far, exemplary embodiments of the present disclosure are described, but the present disclosure is not limited to these exemplary embodiments, and various modifications and changes can be made within the spirit of the present disclosure.

<Exemplary Embodiment of Network Communication>

The imaging apparatus 1000 according to an exemplary embodiment of the present disclosure is connected to the client apparatus 2000 via the network 1500. The client apparatus 2000 can transmit a control command for controlling the imaging apparatus 1000 via the network 1500. The imaging apparatus 1000 controls itself based on a received control command and a parameter included in the control command. Upon receiving a control command, the imaging apparatus 1000 transmits a response to the received control command, to the client apparatus 2000. Upon receiving the response from the imaging apparatus 1000, the client apparatus 2000 updates the content of a user interface displayed on a display unit or the like provided in the client apparatus 2000 based on the information included in the response.

Figure 10:
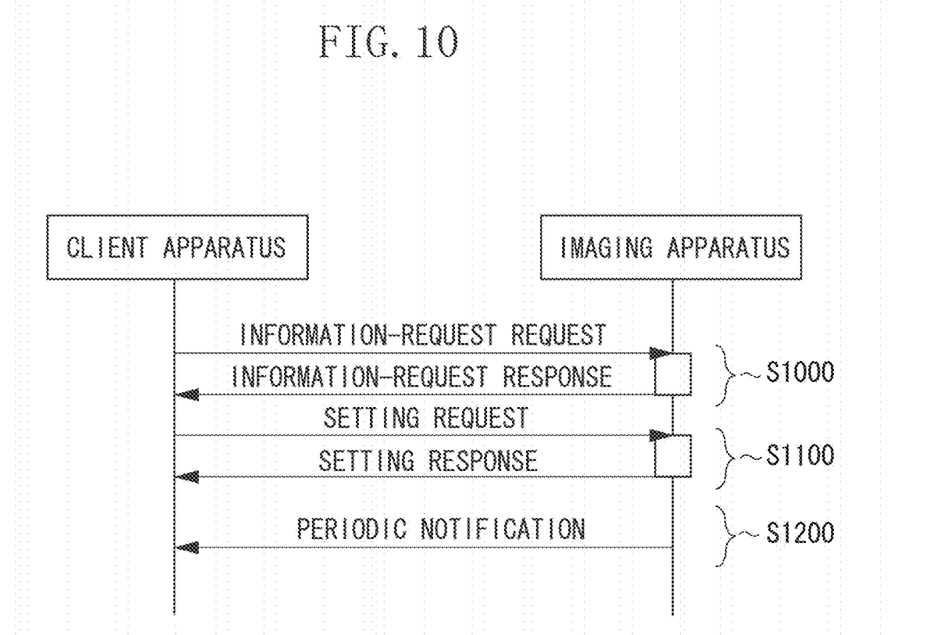
FIG. 10 illustrates communications relating to control commands according to an exemplary embodiment of the present disclosure.

Now, communications relating to control commands between the imaging apparatus 1000 and the client apparatus 2000 will be described with reference to FIG. 10. The client apparatus 2000 and the imaging apparatus 1000 communicate through a transaction, or a combination of a request and a response.

First, in transaction S1000, the client apparatus 2000 transmits an information-request request for acquiring information stored in the imaging apparatus 1000. The information-request request can include, for example, a request for an inquiry as to functions provided in the imaging apparatus 1000. The functions of the imaging apparatus 1000 include a parameter for compression-encoding an image, an image correction function, the presence or absence of a panning-tilting mechanism. The functions of the imaging apparatus 1000 also include setting information relating to the setting of the infrared illumination. The setting information includes types of illumination intensities that the infrared illumination switching unit 109 described above can control. In response to the information-request request, the imaging apparatus 1000 transmits an information-request response. The information-request response includes information on the functions of the imaging apparatus 1000 requested by the client apparatus 2000. The use of such pieces of information enables the client apparatus 2000 to recognize the functions of the imaging apparatus 1000.

The client apparatus 2000 can also acquire the status of the imaging apparatus 1000 through the information-request request. The status of the imaging apparatus 1000 herein includes the current control parameter and the position of the panning-tilting mechanism. The status of the imaging apparatus 1000 also includes the current operation state of the infrared illumination unit 111. The use of such pieces of information enables the client apparatus 2000 to recognize the status of the imaging apparatus 1000.

In transaction S1100, the client apparatus 2000 transmits a setting request for setting various parameters and the like in the imaging apparatus 1000. The setting request is made with the function or the status of the imaging apparatus 1000 acquired in advance in transaction S1000 taken into consideration. For example, a parameter for compression-encoding an image, the image correction function, the operation of the panning-tilting mechanism can be set through the setting request. In addition, the infrared illumination switching unit 109 can be configured through the setting request.

In response to the setting request, the imaging apparatus 1000 transmits a setting response. The setting response includes information as to whether the function and the like of the imaging apparatus 1000 set by the client apparatus 2000 have been set properly. The use of such pieces of information enables the client apparatus 2000 to recognize the status of the imaging apparatus 1000.

In addition, based on the setting from the client apparatus 2000, in transaction S1200, the imaging apparatus 1000 transmits a periodic notification to the client apparatus 2000 periodically or with a predetermined event serving as a trigger. The content of this periodic notification is similar to the content of the information-request response. The use of such pieces of information enables the client apparatus 2000 to recognize the status of the imaging apparatus 1000. For example, in the first exemplary embodiment, when the radiation illuminance E exceeds the permitted radiation illuminance Emax, the imaging apparatus 1000 may notify the client apparatus 2000 of warning information as information relating to the illumination intensity. In addition, in the second exemplary embodiment, when the measuring time has exceeded the permitted time, the imaging apparatus 1000 may notify the client apparatus 2000 of warning information as information relating to the illumination intensity. Upon receiving a notification of such warning information, the client apparatus 2000 notifies a user by displaying a warning on the display unit or the like.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-055208, filed Mar. 18, 2015, which is hereby incorporated by reference herein in its entirety.

What is claimed is:

1. An imaging apparatus comprising:
   an illuminator configured to emit infrared light in an irradiation area to irradiate an object;
   an illumination controller configured to automatically control an infrared illumination intensity of the infrared light emitted by the illuminator;
   an imaging unit configured to capture an image of the object illuminated by the infrared light from the illuminator;
   a target detector configured to detect at least a portion of a human body in the capture image and contained within the irradiation area of the illuminator;
   a radiation illuminance calculator configured to calculate a radiation illuminance of the illuminator with respect to the at least a portion of the human body detected by the target detector; and
   a comparator configured to compare values,
   wherein, while a moving image is captured by the imaging unit, the illumination controller continually limits the infrared illumination intensity of the infrared light that irradiates the at least a portion of a human body based on the comparator comparing the calculated radiation illuminance with a predetermined threshold value.

2. The imaging apparatus according to claim 1, wherein the target detector detects, as the at least a portion of the human body, at least one of a head, a face, and an eye of the human body.

3. The imaging apparatus according to claim 1, wherein the radiation illuminance calculator calculates the radiation illuminance based on the infrared illumination intensity of the emitted infrared light, a distance detected by the target detector to the at least a portion of a human body, and the irradiation area.

4. The imaging apparatus according to claim 1, wherein the radiation illuminance calculator calculates the radiation illuminance based on light distribution characteristics of the illuminator.

5. The imaging apparatus according to claim 1, wherein, in a case where a comparison result of the comparator indicates that the radiation illuminance calculated by the radiation illuminance calculator exceeds the predetermined threshold value and while a moving image is captured by the imaging unit, the illumination controller continually limits the infrared illumination intensity of the infrared light that irradiates the at least a portion of a human body not to exceed a predetermined maximum infrared illumination intensity.

6. The imaging apparatus according to claim 1, further comprising:
a condition controller configured to control an imaging condition with which the imaging unit captures an image; and
a luminance detector configured to detect a luminance within an imaging distance of the imaging unit,
wherein, based on a detection result of the luminance detector, the condition controller controls the imaging condition and the illumination controller controls the infrared illumination intensity of the infrared light emitted by the illuminator.

7. The imaging apparatus according to claim 1, further comprising a timer unit,
wherein, in a case where a comparison result of the comparator indicates that the radiation illuminance calculated by the radiation illuminance calculator exceeds the predetermined threshold value by a difference and while a moving image is captured by the imaging unit, the illumination controller continually limits the infrared illumination intensity of the infrared light that irradiates the at least a portion of a human body to a time period calculated based on the difference.

8. The imaging apparatus according to claim 1, further comprising a communication unit configured to communicate with an external apparatus through a network,
wherein the imaging apparatus receives a control command from the external apparatus through the communication unit.

9. The imaging apparatus according to claim 1, wherein the imaging apparatus transmits, to an external apparatus through a communication unit, information relating to the infrared illumination intensity of the infrared light emitted by the illuminator.

10. A method for controlling an imaging apparatus having an illuminator configured to emit infrared light in an irradiation area to irradiate an object, an illumination controller configured to automatically control an infrared illumination intensity of the infrared light emitted by the illuminator, and an imaging unit configured to capture an image of the object illuminated by the infrared light from the illuminator, the method comprising:
detecting at least a portion of a human body in the capture image and contained within the irradiation area of the illuminator;
calculating a radiation illuminance of the illuminator with respect to the detected at least a portion of the human body; and
comparing values,
wherein, while a moving image is captured by the imaging unit, the illumination controller continually limits the infrared illumination intensity of the infrared light that irradiates the at least a portion of a human body based on comparing the calculated radiation illuminance with a predetermined threshold value.

11. A non-transitory computer-readable storage medium storing a program to cause a computer to perform a method for controlling an imaging apparatus having an illuminator configured to emit infrared light in an irradiation area to irradiate an object, an illumination controller configured to automatically control an infrared illumination intensity of the infrared light emitted by the illuminator, and an imaging unit configured to capture an image of the object illuminated by the infrared light from the illuminator, the method comprising:
detecting at least a portion of a human body in the capture image and contained within the irradiation area of the illuminator;
calculating a radiation illuminance of the illuminator with respect to the detected at least a portion of the human body; and
comparing values,
wherein, while a moving image is captured by the imaging unit, the illumination controller continually limits the infrared illumination intensity of the infrared light that irradiates the at least a portion of a human body based on comparing the calculated radiation illuminance with a predetermined threshold value.

12. The imaging apparatus according to claim 1, further comprising a timer configured to measure a time after the portion of a human body is detected by the target detector,
wherein the illumination controller limits the infrared illumination intensity of the emitted infrared light based on the comparison result of the comparator and a time-measurement result of the timer.

13. The imaging apparatus according to claim 1, wherein the predetermined threshold value relates to infrared illumination intensity which does not affect a human body.

14. The imaging apparatus according to claim 1, wherein the imaging unit captures the moving images through an optical path, the imaging apparatus further comprising an infrared filter driving unit configured to remove an infrared filter from the optical path as part of an infrared imaging mode,
wherein the target detector detects in the infrared imaging mode the at least a portion of a human body in the capture image.

15. The imaging apparatus according to claim 1, wherein, in a case where the captured image is in a low luminance state, the imaging unit is controlled to carry out image processing by using image processing parameters for generating a black and white image.

16. The imaging apparatus according to claim 5, wherein the maximum infrared illumination intensity is calculated based on gender or age of a person within the captured image and varies based on a size of the at least a portion of the human body.

17. A method for controlling an imaging apparatus that includes an illuminator configured to emit infrared light in an irradiation area to irradiate an object, an illumination controller configured to automatically control an infrared illumination intensity of the infrared light emitted by the illuminator, and an imaging unit configured to capture an image of the object illuminated by the infrared light from the illuminator, the method comprising:

detecting at least a portion of a human body in the capture image and contained within the irradiation area of the illuminator; and limiting, while a moving image is captured by the imaging unit, the infrared illumination intensity of the infrared light that irradiates the at least a portion of a human body not to exceed a predetermined maximum infrared illumination intensity.

\* \* \* \* \*